US007304767B2

(12) United States Patent
Sasaki et al.

(10) Patent No.: US 7,304,767 B2
(45) Date of Patent: Dec. 4, 2007

(54) COLOR PROCESSING METHOD, STORAGE MEDIUM, COLOR PROCESSING APPARATUS, COLOR TRANSFORMING APPARATUS, AND IMAGE FORMING APPARATUS

(75) Inventors: Makoto Sasaki, Ashigarakami-gun (JP); Hitoshi Ogatsu, Ashigarakami-gun (JP); Hiroaki Ikegami, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1216 days.

(21) Appl. No.: 10/267,649

(22) Filed: Oct. 10, 2002

(65) Prior Publication Data

US 2003/0072018 A1    Apr. 17, 2003

(30) Foreign Application Priority Data

Oct. 11, 2001   (JP)   ............... 2001-314007

(51) Int. Cl.
*H04N 1/60* (2006.01)
(52) U.S. Cl. .................. 358/1.9; 358/518; 358/529
(58) Field of Classification Search ............ 358/1.9, 358/518, 520, 523, 524, 525, 529, 530; 382/162, 382/167
See application file for complete search history.

(56) References Cited

U.S. PATENT DOCUMENTS 5,471,324 A    11/1995   Rolleston 6,313,925 B1*  11/2001  Decker et al. ............... 358/1.9

FOREIGN PATENT DOCUMENTS

| JP | A-2-136848 | 5/1990 |
|----|-----------|--------|
| JP | A 5-292306 | 11/1993 |
| JP | A-6-98161 | 4/1994 |
| JP | A-6-242523 | 9/1994 |
| JP | A 6-242523 | 9/1994 |
| JP | A-10-173948 | 6/1998 |
| JP | A 10-262157 | 9/1998 |
| JP | A-2000-25274 | 1/2000 |

* cited by examiner

*Primary Examiner*—Kimberly A. Williams
(74) *Attorney, Agent, or Firm*—Oliff & Berridge, PLC

(57) ABSTRACT

A regulated black colorant amount calculating section calculates a corresponding regulated black colorant amount from the L*a*b* of a plurality of typical color signals in a partial color gamut, which can be represented by three colors excluding black. An optimum black colorant amount modeling section performs color prediction modeling to predict an optimum black colorant amount in a whole color gamut from plural sets of the typical color signal and the regulated black colorant amount. At this time, an extrapolation prediction from a color in a partial color gamut to a whole color gamut is performed to predict the optimum black colorant amount in which a natural color reproduction. By using the color prediction modeling, the optimum black colorant amount determining section determines a corresponding optimum black colorant amount from the L*a*b* of an input lattice point. a YMCK signal calculating section determines residual YMC and outputs a YMCK signal.

27 Claims, 11 Drawing Sheets

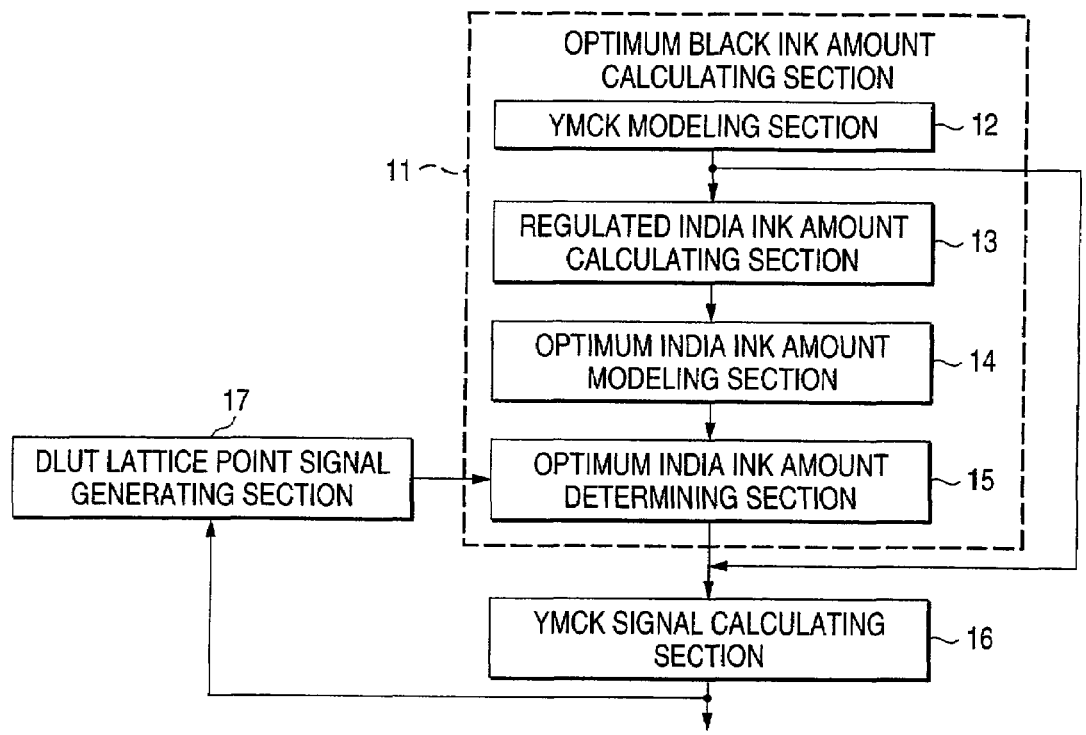
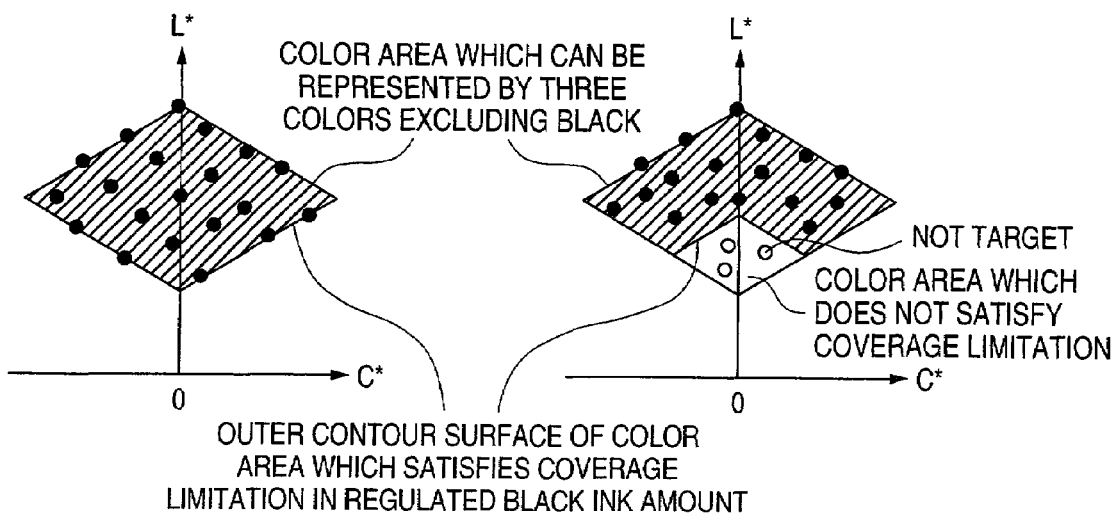

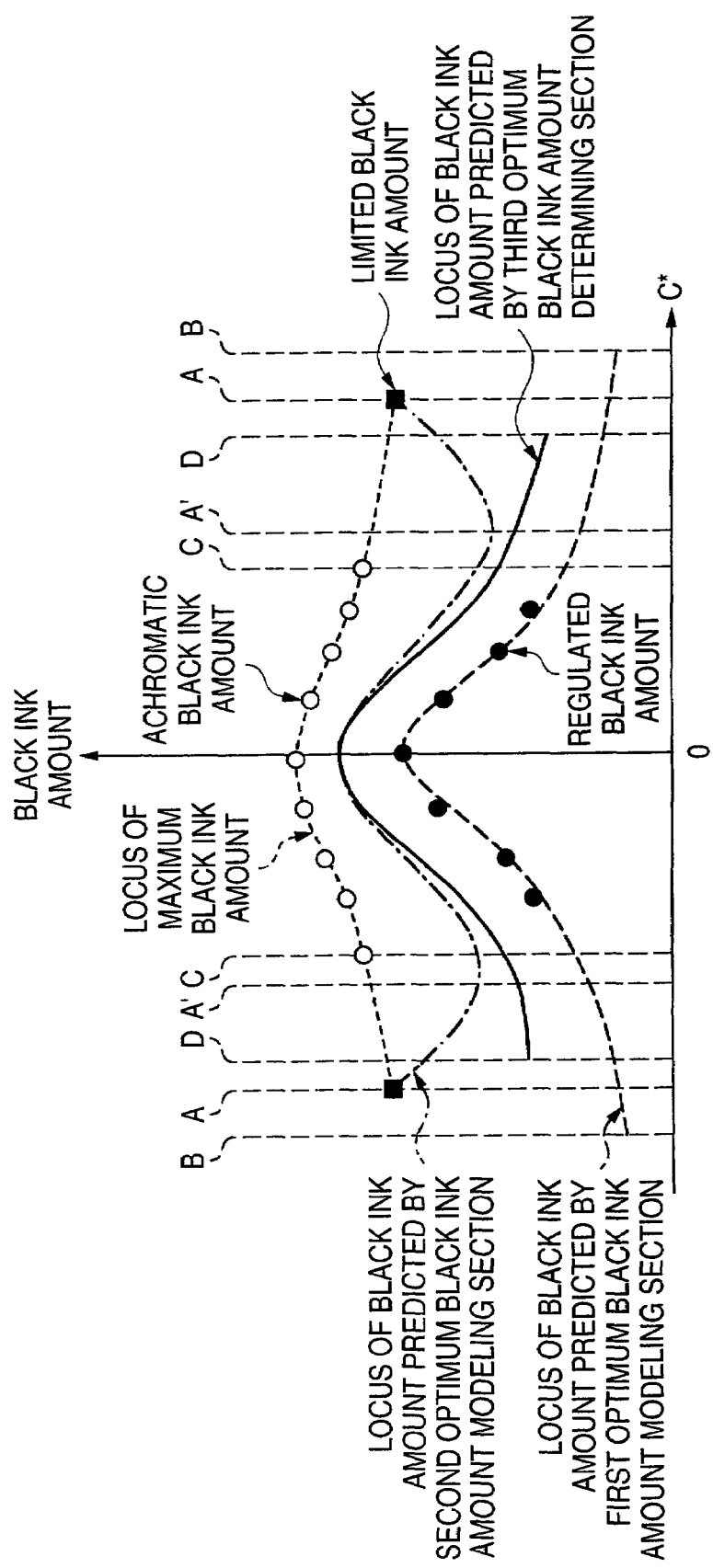

COLOR PROCESSING METHOD, STORAGE MEDIUM, COLOR PROCESSING APPARATUS, COLOR TRANSFORMING APPARATUS, AND IMAGE FORMING APPARATUS

The present disclosure relates to the subject matter contained in Japanese Patent Application No.2001-314007 filed on Oct. 11, 2001, which is incorporated herein by reference in its entirety.

BACKGROUND OF THE INVENTION

1. Field of the Invention

The present invention relates to a color processing method and a color processing apparatus for transforming a color signal in a target color space such as L*a*b* or RGB into a four-color signal including black, a storage medium for storing a program for executing the color processing method, and furthermore, a color transforming apparatus and an image forming apparatus utilizing a result of a transformation carried out by the color processing method and the color processing apparatus.

2. Description of the Related Art

When a color image is color-printed by an electrophotographic method, four-color printing using yellow (Y), magenta (M), cyan (C) and black (K) is usually utilized very often. On the other hand, a color signal on a three-dimensional color space such as L*a*b* and L*u*v* color spaces, which do not depend on a device or an RGB color space used in a monitor signal, is often used for a general color signal. When a color image is color printed, accordingly, it is necessary to transform the color signal on the three-dimensional color space into a four-dimensional color space. However, since this transformation is carried out between different dimensions, it does not correspond one-on-one. There are a plurality of combinations of the color signal on the three-dimensional color space and a four-color signal reproducing the color signal.

As a method for determining the combination of the color signal on the three-dimensional color space and the four-color signal on the four-dimensional color space, the component of black is calculated from Y, M and C and black (K) is then added by foundation color removal. As another method, black (K) is first determined by some method and amounts of Y, M and C corresponding to the amount of black (K) are determined. Recently, the latter method has been a mainstream in respect of a color reproducibility and various methods have been tried.

For example, JP-A-5-292306 has disclosed a method in which preset weighting is first carried out over the K amount (achromatic black colorant amount) of the four-color signal reproducing a target color signal under the conditions of Y=0%, M=0% or C=0%, thereby determining a new K amount. Then, the amounts of Y, M and C reproducing a target color signal are determined according to the K amount. Consequently, a color reproduction can be realized with high precision, and at the same time, the amount of black can be controlled in response to the purpose.

In a method disclosed in JP-A-6-242523, moreover, a K amount (maximum black colorant amount) of a four-color signal reproducing a target color signal is first calculated under conditions of Y=0%, M=0%, C=0% or K=100%. Moreover, a K amount (minimum black colorant amount) of a four-color signal reproducing a target color signal is calculated under conditions of Y=100%, M=100%, C=100% or K=0%. By using the maximum and minimum black colorant amounts thus calculated, a new K amount is determined by a preset parameter therebetween and the new amounts of Y, M and C reproducing the target color signal are determined according to the K amount. Consequently, it is possible to use, at a maximum, a color gamut, which can be reproduced by four colors including black.

A condition of a coverage limitation is imposed to a general output device. The coverage limitation implies that an upper limit is set to the total amount of a recording material such as a toner or an ink, which is used for reproducing a color signal. Mainly, the coverage limitation is used for reducing a deterioration in a reproducing performance caused by excessively utilizing the recording material such as a toner or an ink or in the bulge of a print surface, or for protecting the output device.

In all methods according to the related art, however, the coverage limitation is not taken into consideration. For this reason, in some cases in which the amount of black is controlled by the preset parameter, the reproduction cannot be carried out irrespective of a reproducible color gamut. More specifically, the total amounts of the Y, M, C and K thus calculated depart from the scope of the coverage limitation. As a result, a color gamut compression is caused so that color reproducing precision is deteriorated.

In order to solve such a problem, in Japanese Patent Application No. 2001-34867, for example, an optimum black colorant amount is calculated in a color gamut, which can be reproduced by three colors, and the outermost contour surface of a four-color gamut satisfying the coverage limitation is searched from the contour of the color gamut, which can be reproduced by three colors, and K is determined by using the black colorant amount on the outermost contour surface and the optimum black colorant amount calculated previously. By using the calculated K, thus, it is possible to obtain a combination of Y, M, C and K to satisfy the coverage limitation.

In general, the design of the optimum black colorant amount is usually set to be decreased with an increase in a color saturation component of a target color signal. The reason is that the color becomes dull by a mixture of the black component. By decreasing the black colorant amount with an increase in the color saturation, a natural color reproduction can be carried out. In the black colorant amount obtained by the method disclosed in the Japanese Patent Application No. 2001-34867, however, the black colorant amount in the three-color gamut is regulated as described above and the black colorant amount in the outermost contour of the color gamut satisfying the coverage limitation is the maximum black colorant amount. In an achromatic color, therefore, it is possible to sufficiently use up the color gamut to satisfy the coverage limitation by the Y, M, C and K thus calculated, and the black colorant amount is to be increased with an increase in the color saturation component. As a result, a color signal to be reproduced becomes unnatural in some cases.

SUMMARY OF THE INVENTION

In consideration of the circumstances, it is an object of the invention to provide a color processing method and a color processing apparatus, which can carry out a natural color reproduction and sufficiently use a color gamut, a storage medium storing a program for implementing the color processing method, and furthermore, a color transforming apparatus and an image forming apparatus which utilize a result of a transformation carried out by the color processing method and the color processing apparatus.

The invention is characterized in that a first optimum black colorant amount in all color gamuts which can be represented by four colors is determined by using a set of a plurality of typical color signals in a partial color gamut which can be represented by three colors and a first black colorant amount corresponding to the typical color signals. Thus, the whole color gamut is predicted or extrapolation predicted from the first black colorant amount in the partial color gamut which can be represented by the three colors. Therefore, the whole color gamut can be utilized, and furthermore, the influence of the maximum black colorant amount of the outermost contour of the color gamut to be used in the method described in the Japanese Patent Application No. 2001-34867 can be eliminated and a color reproduction can be carried out more naturally.

In the invention, moreover, a first optimum black colorant amount in all color gamuts which can be represented by four colors is predicted by using a set of a plurality of typical color signals in a partial color gamut which can be represented by three colors and a first black colorant amount corresponding to the typical color signals, and furthermore, a second optimum black colorant amount in all the color gamuts is predicted from a set of a plurality of typical color signals and a first black colorant amount to satisfy a coverage limitation corresponding to the typical color signals and a set of a plurality of typical color signals belonging to an outermost contour curved surface of a color gamut which can be represented by three colors or four colors including black and satisfies the coverage limitation and a second black colorant amount corresponding to the typical color signals. Moreover, the invention is characterized in that a third optimum black colorant amount in all the color gamuts is determined by using the first optimum black colorant amount and the second optimum black colorant amount. For example, the third optimum black colorant amount can be determined by the weighted average of the first optimum black colorant amount and the second optimum black colorant amount using a weight depending on at least one of a luminosity, a color saturation and a hue which are calculated from a color signal in a target color space. By such a structure, for example, it is possible to determine the third optimum black colorant amount which approaches the first optimum black colorant amount with an increase in a color saturation component and approaches the second optimum black colorant amount with an approximation to an achromatic color. Accordingly, the whole color gamut can be utilized, and furthermore, a color reproduction can be carried out more naturally.

BRIEF DESCRIPTION OF THE DRAWINGS

FIG. 1 is a block diagram showing a color processing apparatus and a color processing method according to a first embodiment of the invention.

FIGS. 2A and 2B are charts illustrating examples of a method of selecting a typical color signal.

DETAILED DESCRIPTION OF THE PREFERRED EMBODIMENTS

Figure 3:
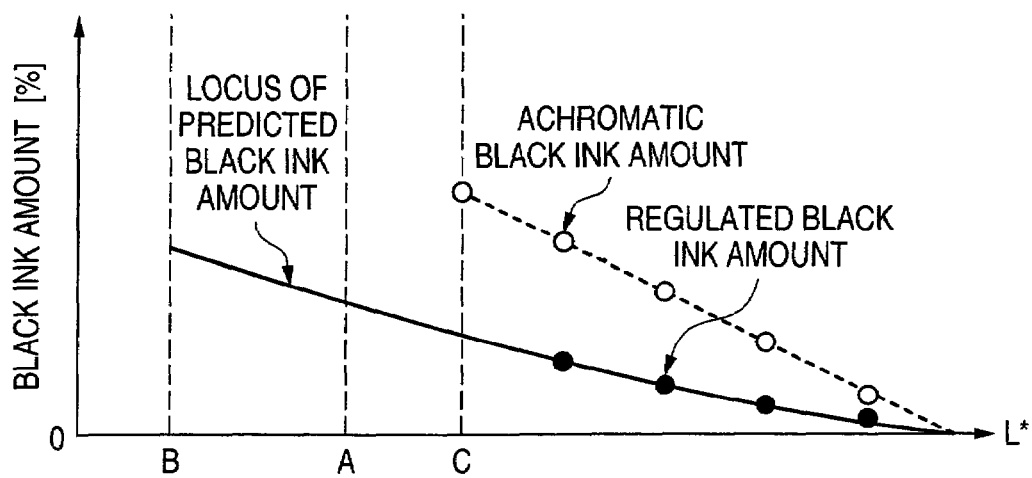
FIGS. 3A and 3B are graphs showing examples of relationships between a luminosity and a black colorant amount and between a color saturation and the black colorant amount in the color processing apparatus and the color processing method according to the first embodiment of the invention.
Figure 3:
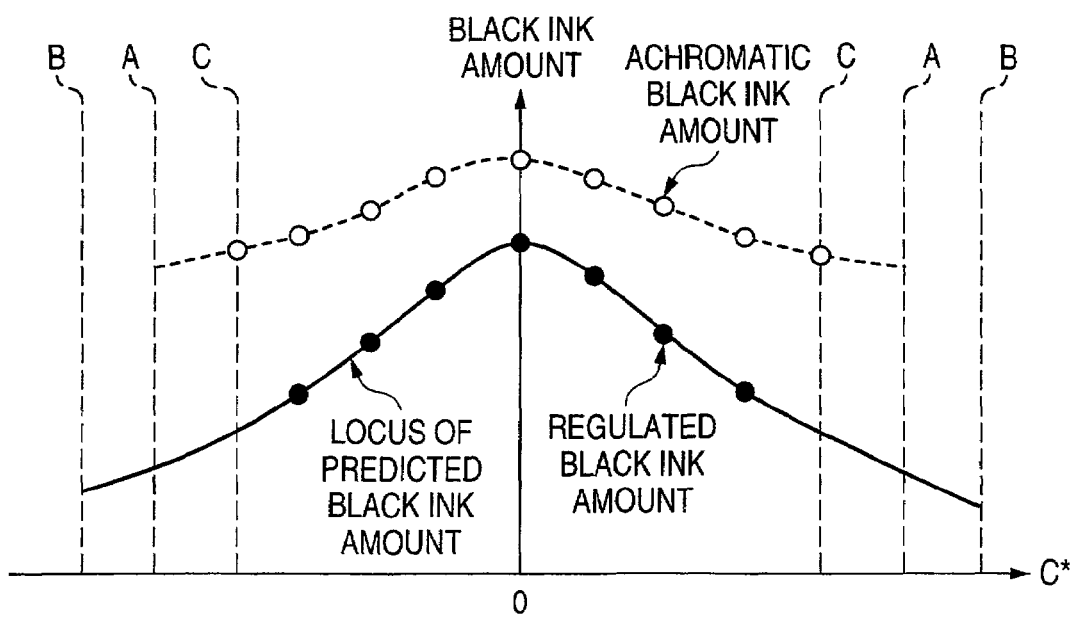

FIG. 1 is a block diagram showing a color processing apparatus and a color processing method according to a first embodiment of the invention. In FIG. 1, 11 denotes an optimum black colorant amount calculating section, 12 denotes a YMCK modeling section, 13 denotes a regulated black colorant amount calculating section, 14 denotes an optimum black colorant amount modeling section, 15 denotes an optimum black colorant amount determining section, 16 denotes a YMCK signal calculating section, and 17 denotes a DLUT lattice point signal generating section. In the embodiment, description will be given to a case in which a target color space is set to be a CIELAB (L*a*b*) color space and a four-color signal including black is set to be Y, M, C and K. The invention is not restricted to this color space but can also be applied to another color space such as CIELUV (L*u*v*) or RGB. With regard to the four-color signal, moreover, a color signal in another color space can be used so long as the color signal includes black (K) such as R, G, B and K.

The optimum black colorant amount calculating section 11 predicts an optimum black colorant amount for a color signal in a target color space (L*a*b* color space) based on a color prediction model from a plurality of sets of a typical color signal in the target color space and a black colorant amount for the typical color signal. At this time, a plurality of color signals belonging to a partial color space to be a color gamut which can be represented by at least three colors are used for the typical color signal. The optimum black colorant amount calculating section 11 includes the YMCK modeling section 12, the regulated black colorant amount calculating section 13, the optimum black colorant amount modeling section 14 and the optimum black colorant amount determining section 15.

The YMCK modeling section 12 carries out the color prediction modeling of an output device in the target color space by a desired method. For a modeling method, for example, it is possible to use a regression method disclosed in JPA-10-262157, a method using a neural network disclosed in JP-A-7-87347, and a weighted average method disclosed in U.S. Pat. No. 5,471,324. As a matter of course, any method can be used so long as a model capable of predicting, from four values of Y, M, C, K, L*, a* and b*, the remaining three values can be constructed. In this example, the method using a weighting regression which has been disclosed in the JP-A-10-262157 will be used. In the YMCK modeling section 12, a proper combination of Y, M, C and K is actually printed to create a color patch and the color of the color patch is actually measured to obtain the values of L*, a* and b*, thereby creating plural sets of the values of Y, M, C and K and the values of L*, a* and b*.

The regulated black colorant amount calculating section 13 selects, as a typical color signal, a plurality of L*a*b* in a color gamut (a partial color gamut) which can be represented by three colors excluding black, calculates an achromatic black colorant amount from the L*a*b*, and furthermore, multiplies the achromatic black colorant amount by a preset colorant control parameter according to the L*a*b*, thereby calculating a regulated black colorant amount. The achromatic black colorant amount implies an black colorant obtained when an unnecessary color is set to be zero, and can be obtained by the method disclosed in the Japanese Patent Application No. 2001-34867, for example.

FIG. 2 is a chart illustrating an example of a method of selecting a typical color signal. In FIG. 2, a black point represents L*a*b*, which is a selection target of the typical color signal, and a white point represents L*a*b*, which is not a selection target of the typical color signal. For example, in the case in which the coverage limitation is relaxed, that is, a coverage limitation value is 300% to 400%, the coverage limitation can be completely satisfied in a partial color gamut which can be represented by three colors excluding black by using the regulated black colorant amount as shown in hatching of FIG. 2(A). However, in the case in which the coverage limitation is narrowed, that is, the coverage limitation value is less than 200%, a color gamut which does not satisfy the coverage limitation is present in the partial color gamut which can be represented by three colors excluding black in the regulated black colorant amount as shown in a region having no hatching in FIG. 2(B). When a color gamut, which does not satisfy the coverage limitation, exists in the partial color gamut, which can be represented by three colors excluding black, the regulated black colorant amount calculating section 13 uses a method for selecting in which L*a*b* in such gamut is not included in a selection target of the typical color signal. That is, in FIG. 2(B), the L*a*b* indicated by the black point is set to be the selection target of the typical color signal because it satisfies the coverage limitation, and the L*a*b* indicated by the white point is set not to be the selection target of the typical color signal because it does not satisfy the coverage limitation. In the case in which the coverage limitation value is extremely small and there are too many points, which is not the selection target of the typical color signal, it is possible to employ a method of obtaining a regulated black colorant amount to satisfy the coverage limitation by searching a portion between the regulated black colorant amount and a maximum black colorant amount.

In this example, plural sets of YMCK and L*a*b* which are created in the YMCK modeling section 12 are used to predict $(n+1)^3$ L*a*b* values from $(n+1)^3$ YMCK (K=0) values being lattice points, which can be obtained by dividing each axis in a YMC color space into n portions by the regression method disclosed in the JP-A-10-262157, for example, and any of the predicted L*a*b*, which satisfies the coverage limitation, is selected as L*a*b* of the typical color signal.

Furthermore, the regulated black colorant amount calculating section 13 calculates a regulated black colorant amount by multiplying an achromatic black colorant amount by a black colorant control parameter depending on at least one of a luminosity, a color saturation and a hue in order to control a black colorant amount in response to the purpose. The black colorant control parameter may be preset in the form of a table in accordance with the purpose, for example, and may be calculated at each time by a function in which L*a*b* is an input and the black colorant control parameter is an output.

In the regulated black colorant amount calculating section 13, thus, it is possible to create plural sets of L*a*b* in a color gamut which can be reproduced by three colors and the regulated black colorant amount which is controlled in accordance with the purpose corresponding to the L*a*b*. The regulated black colorant amount calculated as described above is used as a first black colorant amount corresponding to the typical color signal (L*a*b*) in the color gamut (partial color gamut) which can be reproduced by the three colors. However, the achromatic black colorant amount may be set to be the first black colorant amount, for example. The L*a*b* in the color gamut which can be represented by the three colors excluding black has been used as the typical color signal in the example described above, moreover. However, L*a*b* in a color gamut which can be reproduced by three colors including black may be used as the typical color signal.

The optimum black colorant amount modeling section 14 carries out color prediction modeling between the L*a*b* and the optimum black colorant amount from the plural sets of the regulated black colorant amount corresponding to the L*a*b* which is calculated by the regulated black colorant amount calculating section 13. For a modeling method, it is possible to use the regression method disclosed in the JP-A-10-262157, the method using a neural network disclosed in the JP-A-787347 and the weighted average method disclosed in the U.S. Pat. No. 5,471,324. As a matter of course, it is also possible to use any method which can construct a model capable of predicting an optimum colorant from L*a*b*. Moreover, it is also possible to use various interpolating methods such as a linear interpolation without constructing the prediction model. In this example, the regression method disclosed in the JP-A10-262157 is used, and the optimum black colorant amount modeling section 14 serves to create plural sets of an optimum black colorant amount corresponding to the L*a*b* from plural sets of regulated black colorant amounts corresponding to the L*a*b* which is calculated by the regulated black colorant amount calculating section 13.

Figure 4:
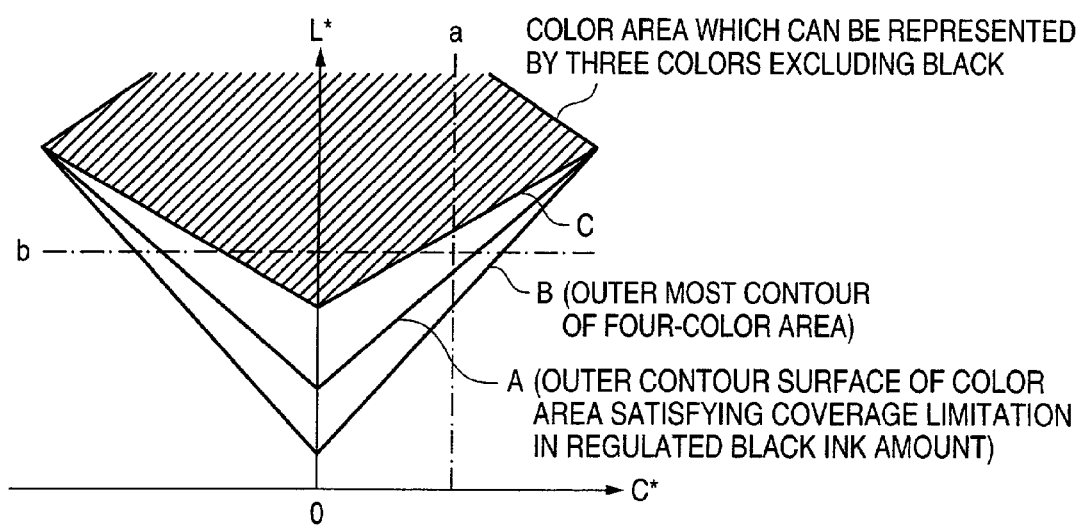
FIG. 4 is a chart illustrating the relationship between the graphs shown in FIG. 3.

FIG. 3 is a graph showing an example of the relationships between a luminosity and a black colorant amount and between a color saturation and the black colorant amount in the color processing apparatus and the color processing method according to the first embodiment of the invention. FIG. 4 is a chart illustrating the relationship of each graph shown in FIG. 3. FIG. 3(A) shows a black colorant amount of colors, which have a certain color saturation and a certain hue and different from each other in luminosity. In other words, FIG. 3(A) shows the relationship between a color and a black colorant amount over a parallel straight line with an L* axis which is indicated as "a" in FIG. 4. In FIG. 3(A), an axis of abscissa indicates L* (luminosity) and an axis of ordinate indicates K (black colorant amount). Moreover, FIG. 3(B) shows colorant amounts having a certain luminosity and color saturation different from each other. More specifically, FIG. 3(B) shows a black colorant amount of a color over an orthogonal straight line to the L* axis which is indicated as b in FIG. 4. In FIG. 3(B), an axis of abscissa indicates C* (color saturation) and an axis of ordinate indicates K (black colorant amount). In both FIGS. 3(A) and 3(B), a white circle represents an achromatic black colorant amount, a black circle represents a regulated black colorant amount calculated by the regulated black colorant amount calculating section 13, an outer contour A represents an outermost contour of a color gamut to satisfy the coverage limitation, an outer contour B represents an outermost contour of a four-color gamut, and an outer contour C represents an outermost contour of a color gamut (partial color gamut) which can be reproduced by three colors excluding black.

In the optimum black colorant amount modeling section 14, the relationship between L* and a black colorant amount shown in a solid line of FIG. 3(A) and the relationship between C* and the black colorant amount shown in a solid line of FIG. 3(B) are predicted by color prediction modeling based on the regulated black colorant amount shown in the black circle of FIG. 3. Data to be used for the modeling are the typical color signal (L*a*b*) in the color gamut (partial color gamut), which is calculated by the regulated black colorant amount calculating section 13 and can be reproduced by three colors excluding black, and a corresponding regulated black colorant amount. With regard to a color on the outside of the color gamut (partial color gamut) which can be reproduced by the three colors excluding black, accordingly, an extrapolation predicted model is created. A black colorant amount predicted at a time of modeling in the optimum black colorant amount modeling section 14 is set to be an optimum black colorant amount.

The optimum black colorant amount determining section 15 determines an optimum black colorant amount from the input L*a*b* by using the color prediction modeling constructed by the optimum black colorant amount modeling section 14. In this example, plural sets of the L*a*b* and the optimum black colorant amount which are created by the optimum black colorant amount modeling section 14 are used to determine the optimum black colorant amount by predicting the optimum black colorant amount from the L*a*b* through the regression method disclosed in the JP-A-10-262157, for example.

By such a structure, the optimum black colorant amount calculating section 11 can predict an optimum black colorant amount based on the color prediction modeling between the L*a*b* and the optimum black colorant amount by the optimum black colorant amount modeling section 14, with regard to the L*a*b* input from the DLUT lattice point generating section 17 in this example. As is apparent from FIG. 3, moreover, the predicted model is such that the black colorant amount is decreased with an increase in a luminosity and the black colorant amount is decreased with an increase in a color saturation. Accordingly, it is possible to determine the optimum black colorant amount capable of carrying out a natural color reproduction.

The YMCK signal calculating section 16 predicts YMC by using the L*a*b* input to the optimum black colorant amount determining section 15 and the optimum black colorant amount calculated by the optimum black colorant amount determining section 15, and determines YMCK by the predicted YMC and the optimum black colorant amount. Specifically, plural sets of L*a*b* and YMCK which are created by the YMCK modeling section 12 are used to predict the YMC from the input L*a*b* and the corresponding optimum black colorant amount by the regression method disclosed in the JP-A-10-262157, for example. Thus, the YMCK corresponding to the input L*a*b* can be determined.

In the example shown in FIG. 1, a multidimensional transformation table (DLUT) is generated by using the optimum black colorant amount calculating section 11 and the YMCK signal calculating section 16 described above. The generated DLUT is a three-dimensional table in which each of the axes of the L*a*b* color space is divided and the YMCK signal is caused to correspond to the L*a*b* of the lattice point. When an optional color signal is input, the YMCK signal corresponding to the input color signal can be obtained by an interpolation from a lattice point corresponding to the input color signal or a lattice point in the vicinity thereof, for example.

In order to generate such DLUT, the DLUT lattice point signal generating section 17 generates L*a*b* corresponding to the lattice point and inputs the L*a*b* to the optimum black colorant amount determining section 15. For example, L* is set to be 0 to 100 and a* and b* are set to be −128 to 128, and the L*, a* and b* corresponding to $17^3=4913$ lattice points obtained by dividing each axis into 16 portions are sequentially generated one by one and are input to the optimum black colorant amount determining section 15. Thus, it is preferable that the black colorant amount determined by the optimum black colorant amount determining section 15 and the YMC predicted by the YMCK signal calculating section 16 with the use of the black colorant amount should be set to be data of the lattice point corresponding to the input L*a*b*.

Thus, it is possible to create the DLUT for generating the YMCK from the L*a*b*. By using the DLUT, the image data of the L*a*b* color space and a partial image thereof can be transformed into the image data of the YMCK color space and a partial image thereof.

The construction from the YMCK modeling section 12 of the optimum black colorant amount calculating section 11 to the YMCK signal calculating section 16 has been described above as a serial flow, and furthermore, the construction for generating the DLUT has been described. The operation from the YMCK modeling section 12 to the optimum black colorant amount modeling section 14 can be previously carried out if an output device such as a color printer and a black colorant control parameter to be preset are determined. In this case, it is preferable that the optimum black colorant amount determining section 15 and the YMCK signal calculating section 16 are operated. For example, when the DLUT is to be generated, the operation from the YMCK modeling section 12 to the optimum black colorant amount modeling section 14 is not required if a processing to reach the optimum black colorant amount modeling section 14 is previously performed. It is preferable that the L*a*b* of the lattice point generated by the DLUT lattice point signal generating section 17 is input to the optimum black colorant amount determining section 15 and the YMCK signal is acquired from the YMCK signal calculating section 16.

While the example in which the YMCK signal corresponding to the L*a*b* of the lattice point of the DLUT is acquired has been described above, the invention is not restricted thereto. For example, typical L*a*b* may be input to the optimum black colorant amount determining section 15 to generate a transformation coefficient for color-transforming a color input image based on the correspondence relationship with the YMCK signal acquired from the YMCK signal calculating section 16. By using the transformation coefficient thus generated, it is possible to carryout a color transformation from optional L*a*b* to the YMCK signal. By directly using the optimum black colorant amount determining section 15 and the YMCK signal calculating section 16, furthermore, it is also possible to acquire the YMCK signal by setting the optional L*a*b* to be an input.

Figure 5:
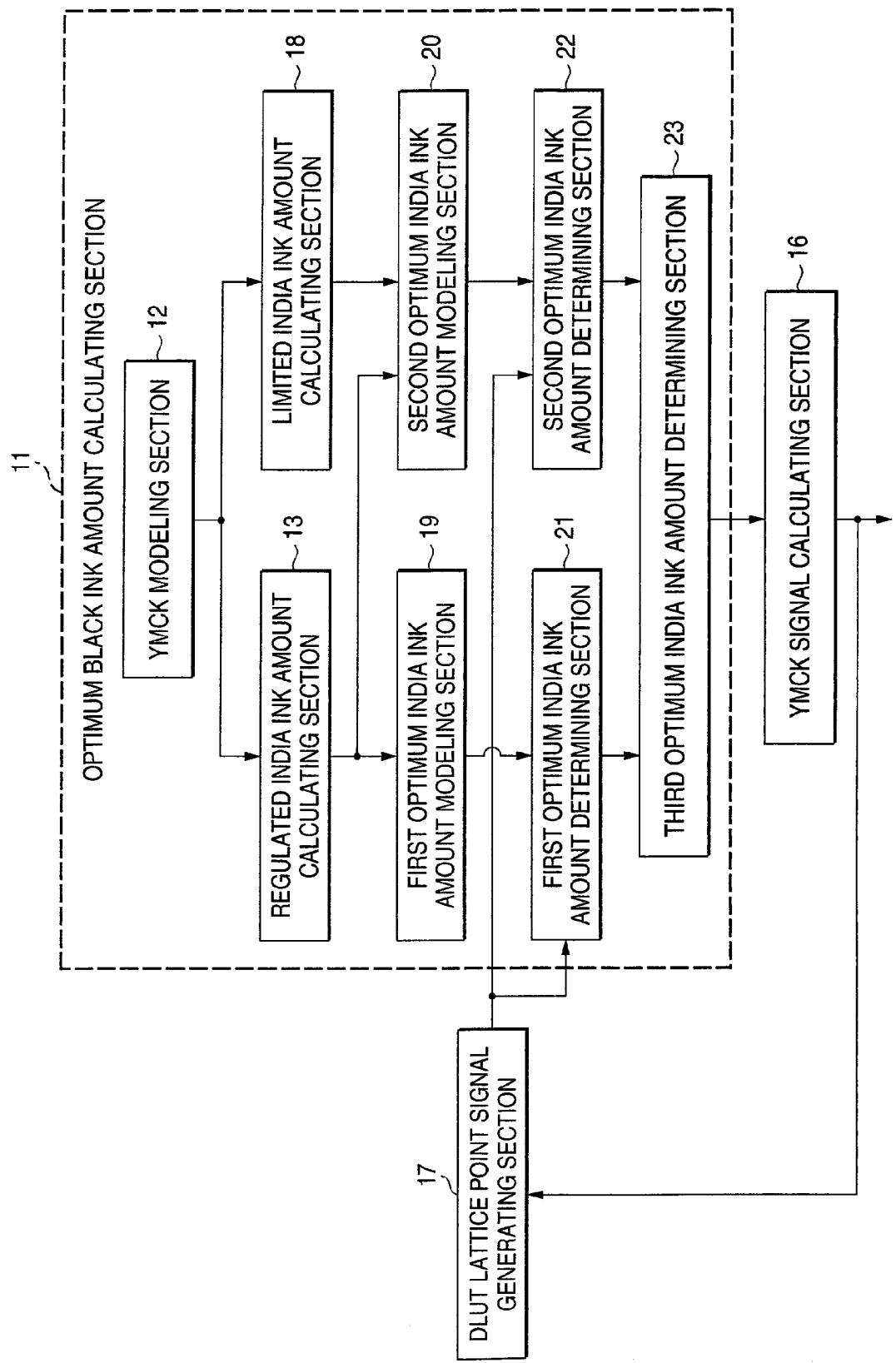
FIG. 5 is a block diagram showing a color processing apparatus and a color processing method according to a second embodiment of the invention.

FIG. 5 is a block diagram showing a color processing apparatus and a color processing method according to a second embodiment of the invention. In FIG. 5, the same portions as those in FIG. 1 have the same reference numerals and repetitive description will be omitted. 18 denotes a limited black colorant amount calculating section, 19 denotes a first optimum black colorant amount modeling section, 20 denotes a second optimum black colorant amount modeling section, 21 denotes a first optimum black colorant amount determining section, 22 denotes a second optimum black colorant amount determining section, and 23 denotes a third optimum black colorant amount determining section. Also in the second embodiment, description will be given to a case in which a target color space is set to be a CIELAB (L*a*b*) color space and a four-color signal including black is set to be Y, M, C and K in the same manner as in the first embodiment. The invention is not restricted to this color space but can also be applied to other color spaces such as CIELUV (L*u*v*) and RGB. Moreover, the four-color signal may be a color signal in another color space such as R, G, B and K so long as the another color space includes black (K).

An optimum black colorant amount calculating section 11 includes a YMCK modeling section 12, a regulated black colorant amount calculating section 13, a limited black colorant amount calculating section 18, a first optimum modeling section 19, a second optimum modeling section 20, a first optimum black colorant amount determining section 21, a second optimum black colorant amount determining section 22, and a third optimum black colorant amount determining section 23. Since the YMCK modeling section 12 and the regulated black colorant amount calculating section 13 in the second embodiment are the same as those in the first embodiment, description will be omitted.

Figure 6:
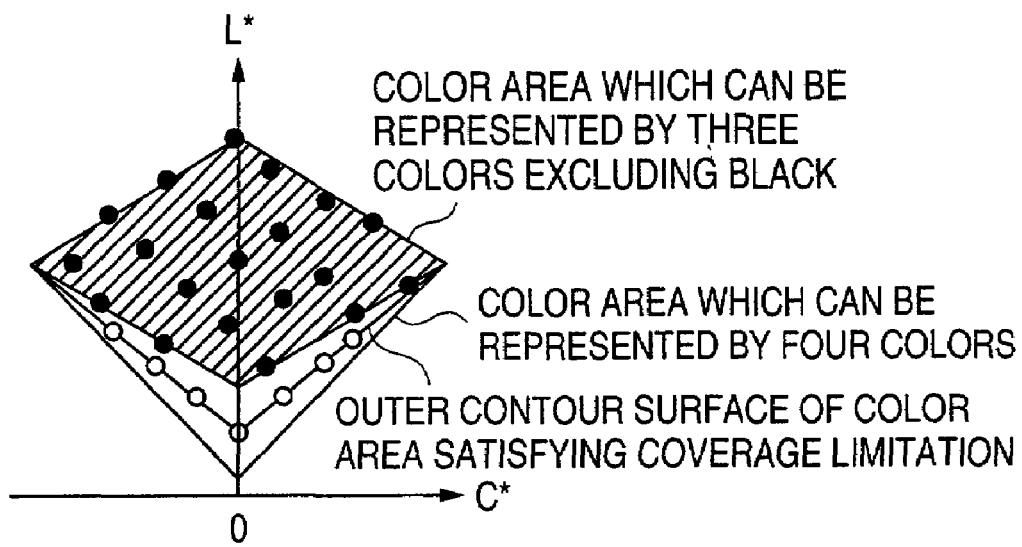
FIGS. 6A and 6B are charts illustrating examples of relationships among a color gamut outer contour satisfying a coverage limitation, a color gamut, which can be represented by three colors excluding black, and a color gamut, which can be represented by four colors.
Figure 6:
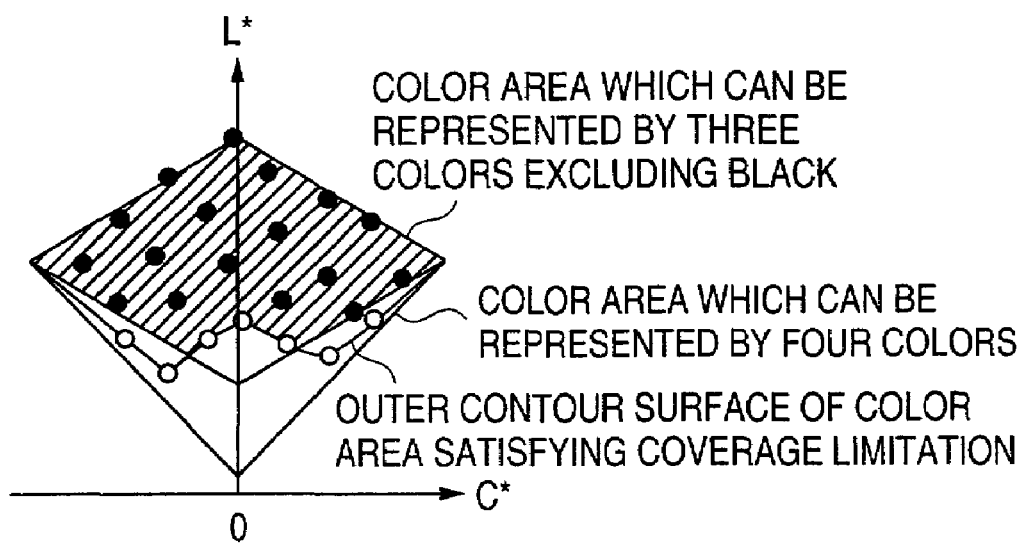

The limited black colorant amount calculating section 18 selects a plurality of L*a*b* on the outer contour in a color gamut satisfying the coverage limitation, calculates a maximum black colorant amount in the selected L*a*b* and sets the maximum black colorant amount thus calculated to be a limited black colorant amount (second black colorant amount). Then, plural sets of the selected L*a*b* and the limited black colorant amount corresponding thereto are created. FIG. 6 is a chart illustrating an example of a relationship among the outer contour of the color gamut satisfying the coverage limitation and a color gamut which can be represented by three colors excluding black and a color gamut which can be represented by four colors. FIG. 6(A) shows a case in which a coverage limitation value is great and FIG. 6(B) shows a case in which the coverage limitation value is small. A black circle indicates a typical color signal (L*a*b*) satisfying the coverage limitation in the color gamut, which can be represented by the three colors excluding black. A regulated black colorant amount corresponding to this L*a*b* is calculated by the regulated black colorant amount calculating section 13. Moreover, a white circle indicates a typical color signal (L*a*b*) on the outermost contour of the color gamut satisfying the coverage limitation, and a limited black colorant amount corresponding to this L*a*b* is calculated by the limited black colorant amount calculating section 18.

Figure 7:
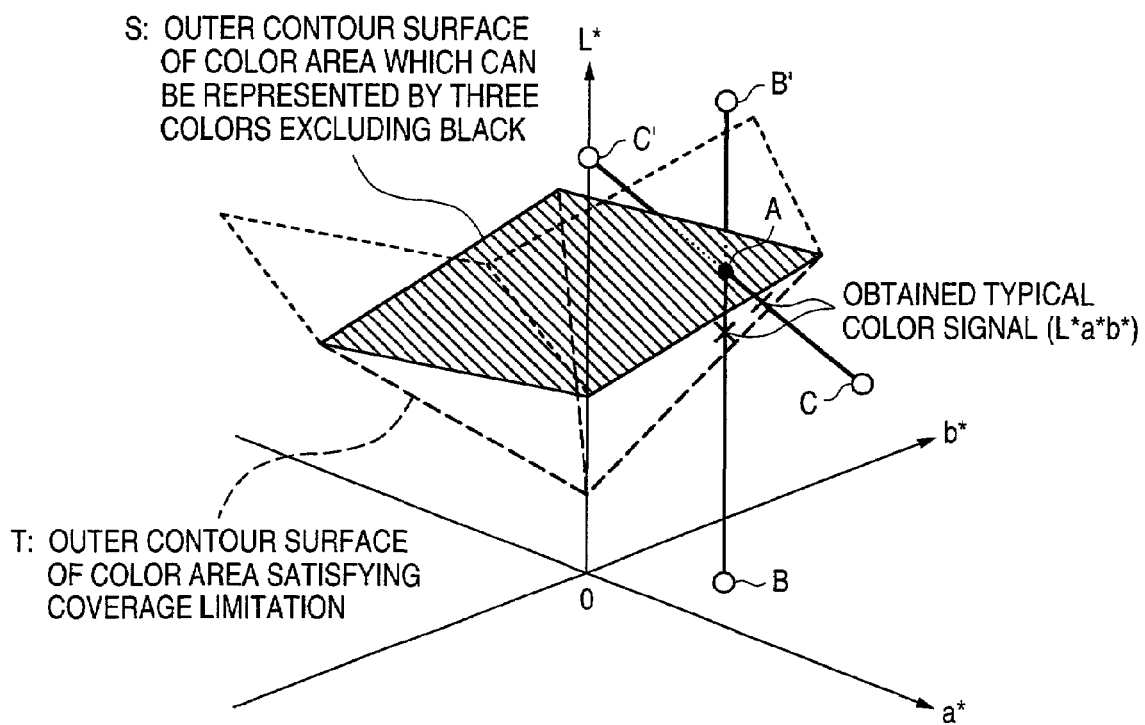
FIG. 7 is a chart illustrating an example of a method for selecting a typical color signal on the outermost contour of a color gamut satisfying the coverage limitation in a limited black colorant amount calculating section.

FIG. 7 is a chart illustrating an example of a method for selecting a typical color signal on the outermost contour of the color gamut satisfying the coverage limitation in the limited black colorant amount calculating section 18. First of all, proper L*a*b* positioned on an outermost contour surface S of the color gamut which can be represented by the three colors shown in the black circle of FIG. 7 and having a tertiary color is calculated as a point A in the color gamut. The point A in the color gamut can be calculated by predicting the value of L*a*b* from the value of YMCK (K=0) in which Y, M and C are not zero and at least one of the Y, M and C is 100% in a lattice point obtained by dividing each axis in a YMC color space into n portions through a weighting linear regression using plural sets of YMCK and L*a*b*, which are created in the YMCK modeling section 12, for example. Moreover, points B and B' indicated by the white circles in FIG. 7 are set. The point B in this example has a color in which L* on the point A in the color gamut is zero and the point B' is a color which is set to be much greater than L* on the point A in the color gamut. Similarly, a point C indicated by the white circle has a color in which a* and b* are set to zero in a direction of a color gamut compression from the point A in the color gamut, and a point C' has a color in which a* and b* are set to be much greater in a reverse direction to the color gamut compression from the point A.

The point A in the color gamut thus calculated is subjected to a dichotomizing search in a B direction (a direction of a four-color gamut including black) if the points B and B' are set and the coverage limitation is satisfied, in a B' direction (a direction in a three-color gamut) if the coverage limitation is not satisfied, in a C direction (a direction of a four-color gamut including black) if the points C and C' are set and the coverage limitation is satisfied, and in a C' direction (the direction in the three-color gamut) if the coverage limitation is not satisfied. Thus, L*a*b* on the outermost contour in the color gamut satisfying the coverage limitation is calculated. In general, a total color material amount is minimized in a combination of YMCK to which the black colorant is added at a maximum. In consideration of the foregoing, a maximum black colorant amount corresponding to L*a*b* subjected to the dichotomizing search is calculated, and the YMC is predicted from the maximum black colorant amount and the L*a*b*. If the YMCK ranges from 0% to 100% and the sum of the YMCK is equal to or smaller than a coverage limitation value, it is preferable that a reproduction can be carried out by four colors including black or three colors excluding black and the coverage limitation should be satisfied. In the case in which the YMCK is set beyond such range or the total color material amount is larger than the coverage limitation, it is decided that the conditions are not satisfied, and furthermore, the dichotomizing search is executed. If the conditions are satisfied, the maximum black colorant amount at that time is stored.

As a result of the execution of the dichotomizing search, thus, it is possible to select the L*a*b* on the outermost contour in the color gamut which can be reproduced by the four colors including black or the three colors excluding black and satisfies the coverage limitation. The maximum black colorant amount stored when the conditions are satisfied in the process of the dichotomizing search is set to be a limited black colorant amount corresponding to the L*a*b*.

While the method for carrying out the dichotomizing search between the point A and the point B or B' in the color gamut has been used in the above description, it is also possible to use any method capable of calculating L*a*b* on a boundary which can be reproduced by the four colors including black or the three colors excluding black and satisfies the coverage limitation. For example, it is also possible to calculate, by a search, a point in which a color difference is minimum, the YMCK ranges from 0% to 100% and the total color material amount is equal to or smaller than the coverage limitation from a point in which L*=0 is set.

The maximum black colorant amount can be calculated by the method disclosed in the Japanese Patent Application No. 2001-34867, and a minimum black colorant amount used when obtaining the maximum black colorant amount can also be calculated by the method disclosed in the Japanese Patent Application No. 2001-34867, for example.

On the other hand, in the regulated black colorant amount calculating section 13, a typical color signal (L*a*b*) in a color gamut which can be represented by the three colors excluding black shown in the black point of FIG. 6 is selected and a regulated black colorant amount corresponding to the L*a*b* thus selected is calculated to create a set of the L*a*b* and the regulated black colorant amount as described in the first embodiment. The set of the L*a*b* and the regulated black colorant amount is transferred to the first optimum black colorant amount modeling section 19 and to the second optimum black colorant amount modeling section 20. The first optimum black colorant amount modeling section 18 and the first optimum black colorant amount determining section 21 are similar to the optimum black colorant amount modeling section 14 and the optimum black colorant amount determining section 15 according to the first embodiment shown in FIG. 1. Color prediction modeling between the L*a*b* and the optimum black colorant amount is carried out based on the set of the typical color signal (L*a*b*) and the regulated black colorant amount which are created in the regulated black colorant amount calculating section 13. The first optimum black colorant amount corresponding to the input L*a*b* is determined in accordance with the model.

In the second optimum black colorant amount modeling section 20, color prediction modeling between the L*a*b* and the second optimum black colorant amount is carried out based on plural sets of the L*a*b* and the regulated black colorant amount which are calculated by the regulated black colorant amount calculating section 13 and plural sets of the L*a*b* and the limited black colorant amount which are calculated by the limited black colorant amount calculating section 18. As a modeling method, it is possible to use the regression method disclosed in the JP-A-10-262157, the method using a neural network disclosed in the JP-A-7-87347 and the weighted average method disclosed in the U.S. Pat. No. 5,471,324, for example. As a matter of course, it is also possible to use any method capable of constructing a model which can predict an optimum black colorant amount from the L*a*b*. Moreover, it is also possible to use various interpolating methods such as a linear interpolation without constructing the prediction model. In this example, the regression method disclosed in the JP-A-10-262157 is used, and the second optimum black colorant amount modeling section 20 predicts an optimum black colorant amount corresponding to the L*a*b* selected by the regulated black colorant amount calculating section 13 and creates plural sets of the L*a*b* and the second optimum black colorant amount.

Figure 8:
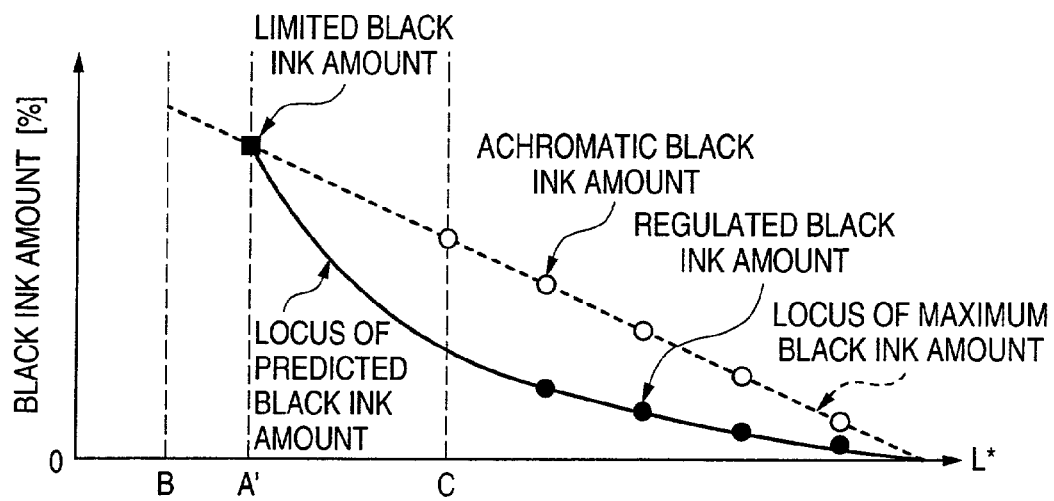
FIGS. 8A and 8B are graphs showing examples of relationships between a luminosity and a black colorant amount and between a color saturation and the black colorant amount in a model created by a second optimum black colorant amount modeling section in the color processing apparatus and the color processing method according to the second embodiment of the invention.
Figure 8:
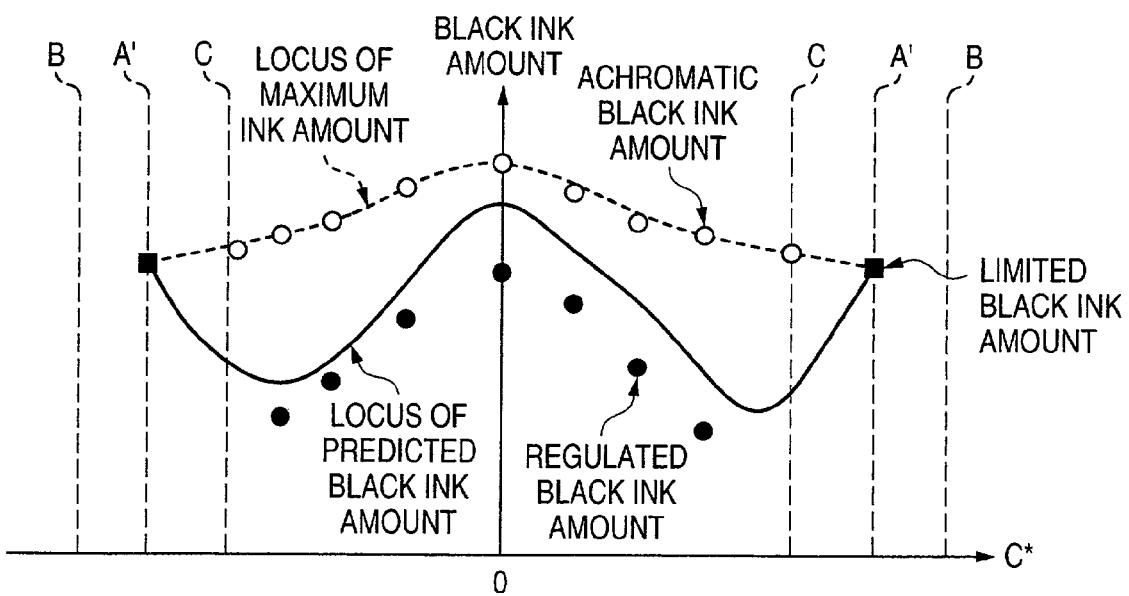

FIG. 8 is a graph showing an example of the relationships between a luminosity and a black colorant amount and between a color saturation and the black colorant amount in the model created by the second optimum black colorant amount modeling section 20 in the color processing apparatus and the color processing method according to the second embodiment of the invention. FIG. 8(A) shows a black colorant amount of colors having a certain color saturation and a certain hue and luminosity different from each other. For example, FIG. 8(A) shows a black colorant amount in a color over a parallel straight line with an L* axis which is indicated as "a" in FIG. 4. In FIG. 8(A), an axis of abscissa indicates L* (luminosity) and an axis of ordinate indicates K (black colorant amount). FIG. 8(B) shows a black colorant amount having a certain luminosity and a different color saturation. For example, FIG. 8(B) shows a black colorant amount in a color over an orthogonal straight line to the L* axis which is indicated as b in FIG. 4. In FIG. 8(B), an axis of abscissa indicates C* (color saturation) and an axis of ordinate indicates K (black colorant amount). In both FIGS. 8(A) and 8(B), a white circle represents an achromatic black colorant amount, a black circle represents a regulated black colorant amount calculated by the regulated black colorant amount calculating section 13, for example, and an outer contour A' represents an outermost contour of a color gamut satisfying a coverage limitation using a maximum black colorant amount, differently from the outer contour A in FIG. 3, of which notation is set to be the outer contour A'. Since the maximum black colorant amount is used, the color gamut is more enlarged than that in FIG. 3. An outer contour B represents an outermost contour in a four-color gamut, and an outer contour C represents an outermost contour in a color gamut which can be reproduced by three colors excluding black.

In the second optimum black colorant amount modeling section 20, the relationship of a black colorant amount having a characteristic in an L* direction indicated by a solid line in FIG. 8(A) and a characteristic in a C* direction indicated by a solid line in FIG. 8(B) is predicted by color prediction modeling based on the regulated black colorant amount indicated by the black circle and a limited black colorant amount indicated by a black square of FIG. 8. The white and black points showing the achromatic black colorant amount and the regulated black colorant amount in FIG. 8(B) are displayed to represent the quantitative relationship of the second optimum black colorant amount thus predicted, and do not correspond to a typical color signal utilized for the modeling. As is apparent from FIG. 8(A), particularly, the limited black colorant amount in the outermost contour A' in the color gamut satisfying the coverage limitation is used for the modeling. Therefore, the predicted second optimum black colorant amount and the regulated black colorant amount are separated from each other with an approach to the outermost contour A' in the color gamut satisfying the coverage limitation. As seen in the C* direction in this portion, the predicted second optimum black colorant amount is not coincident with the regulated black colorant amount as shown in FIG. 8(B).

The second optimum black colorant amount determining section 22 determines the second optimum black colorant amount corresponding to the input L*a*b* by using the color prediction modeling constructed by the second optimum black colorant amount modeling section 20. In this example, plural sets of the typical color signal (L*a*b*) created by the second optimum black colorant amount modeling section 20 and the second optimum black colorant amount are used to predict the second optimum black colorant amount from the L*a*b* by the regression method disclosed in the JP-A-10-262157, for example, thereby determining the second optimum black colorant amount corresponding to the input L*a*b*.

In the second optimum black colorant amount determining section 22, a black colorant amount capable of using the color gamut at a maximum is calculated. As shown in FIG. 8(B), the black colorant amount is suddenly increased with an increase in a color saturation. In the second embodiment, therefore, the first optimum black colorant amount calculated by the first optimum black colorant amount determining section 21 and the second optimum black colorant amount calculated by the second optimum black colorant amount determining section 22 are synthesized and a third optimum black colorant amount is determined by the third optimum black colorant amount determining section 23.

Figure 9:
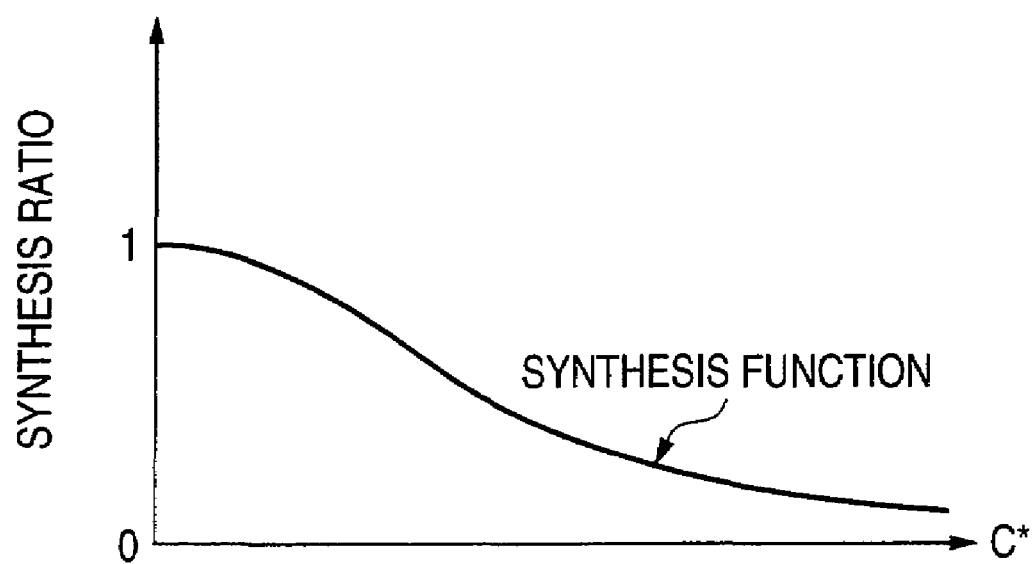
FIG. 9 is a chart illustrating an example of a method of synthesizing a first optimum black colorant amount and a second optimum black colorant amount in a third black colorant amount determining section.

FIG. 9 is a chart illustrating an example of a method for synthesizing the first optimum black colorant amount and the second optimum black colorant amount in the third optimum black colorant amount determining section 23. In the graph of FIG. 9, an axis of abscissa indicates a color saturation (C*) and an axis of ordinate indicates a synthesis ratio. The synthesis ratio represents a ratio of employed second optimum black colorant amount calculated by the second optimum black colorant amount determining section 22. In an example of a synthesis function shown in FIG. 9, a synthesis ratio of 1 is set with C*=0, and a smooth function is shown with a monotone decrease. By using such a synthesis function in the third optimum black colorant amount determining section 23, it is possible to composite the first optimum black colorant amount and the second optimum black colorant amount. In the case of C*=0, that is, an achromatic color, consequently, it is possible to use the black colorant amount at a maximum by employing 100% of the second optimum black colorant amount calculated by the second optimum black colorant amount determining section 22. Moreover, the ratio of the first optimum black colorant amount calculated by the first optimum black colorant amount determining section 21 is increased with an increase in a color saturation component. Consequently, the black colorant amount can be prevented from being increased with an increase in the color saturation and a natural color reproduction can be carried out.

A synthesis can be carried out by the following equation, wherein the first optimum black colorant amount calculated by the first optimum black colorant amount determining section 21 is defined as K1, the second optimum black colorant amount calculated by the second optimum black colorant amount determining section 22 is defined as K2, a synthesis function is defined as r=f(C*) and the black colorant amount thus synthesis is defined as KM.

$$KM = (K2 - K1) \cdot f(|C^*|) + K1$$

Figure 10:
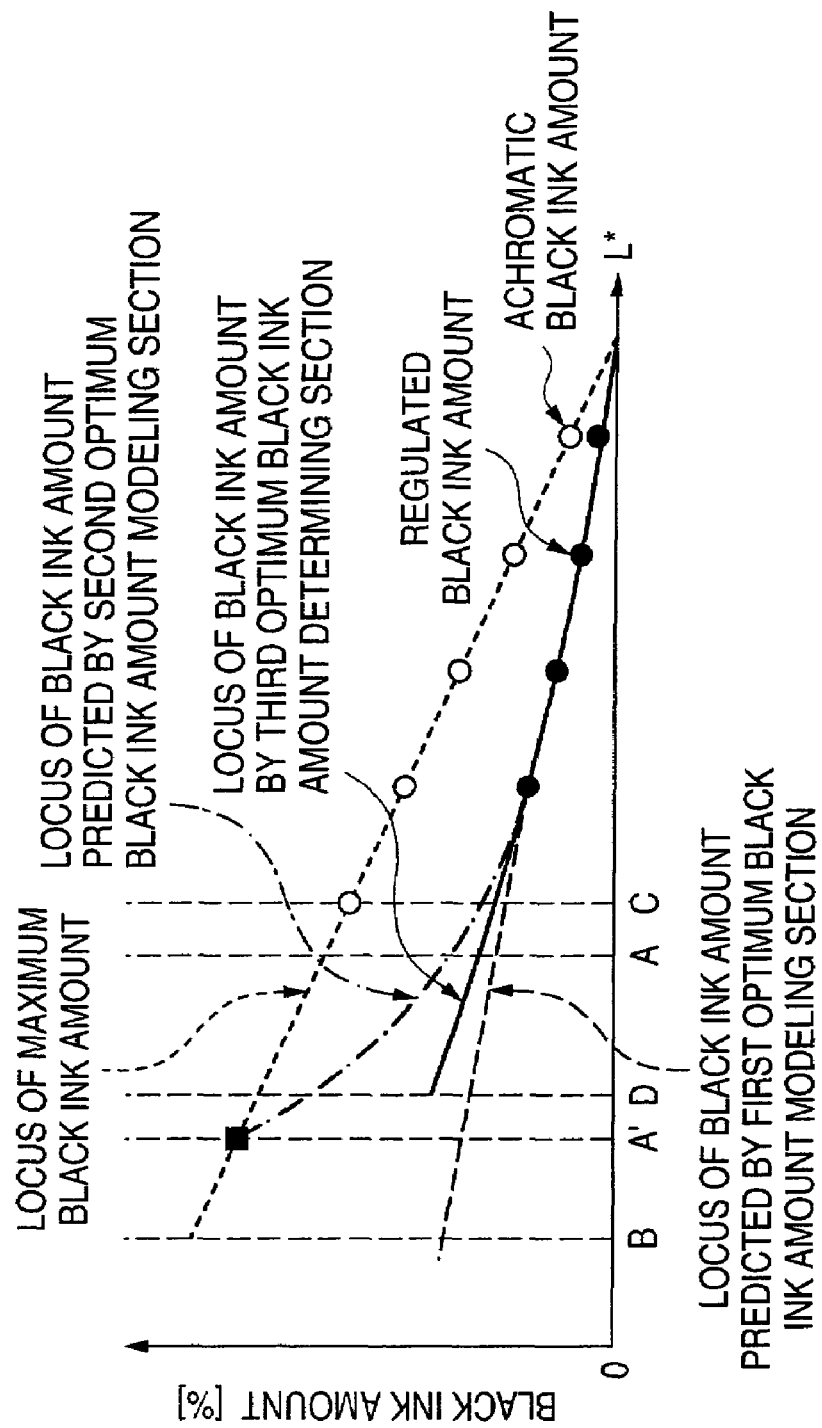
FIGS. 10A and 10B are graphs showing examples of relationships between a luminosity and a black colorant amount and between a color saturation and the black colorant amount, which are determined in a third optimum black colorant amount modeling section in the color processing apparatus and the color processing method according to the second embodiment of the invention.

FIG. 10 is a graph showing an example of the relationships between a luminosity and a black colorant amount and between a color saturation and the black colorant amount, which are determined by the third optimum black colorant amount modeling section 23 in the color processing apparatus and the color processing method according to the second embodiment of the invention. In the same manner as in FIGS. 3 and 8, FIG. 10(A) shows a black colorant amount of colors having a certain color saturation and a certain hue and luminosity different from each other, and an axis of abscissa indicates L* (luminosity) and an axis of ordinate indicates K (black colorant amount). Moreover, FIG. 10(B) shows black colorant amounts having a certain luminosity and color saturation different from each other, an axis of abscissa indicates C* (color saturation) and an axis of ordinate indicates K (black colorant amount). In both FIGS. 10(A) and 10(B), a white circle represents an achromatic black colorant amount, a black circle represents a regulated black colorant amount, a black square represents a limited black colorant amount calculated by the limited black colorant amount calculating section 18, an outer contour A' represents the outer contour A' shown in FIG. 8, an outer contour A represents the outer contour A in FIG. 3, an outer contour B represents an outermost contour of a four-color gamut in FIGS. 3 and 8, an outer contour C represents the outermost contour of the color gamut which can be reproduced by three colors excluding black in FIGS. 3 and 8, and an outer contour D represents an outer contour of a color gamut satisfying the coverage limitation generated by the third optimum black colorant amount determining section 23. The locus of the first optimum black colorant amount predicted by the first optimum black colorant amount modeling section 19 is shown in a broken line, the locus of the second optimum black colorant amount predicted by the second optimum black colorant amount modeling section 20 is shown in a one-dotted chain line, and the locus of the third optimum black colorant amount calculated by the third optimum black colorant amount determining section 23 is shown in a solid line.

As shown in a solid line of FIG. 10, according to the third optimum black colorant amount determining section 23 in accordance with the second embodiment of the invention, the black colorant amount can be used at a maximum in an achromatic color gamut and the black colorant amount can be decreased when the color saturation component is increased. Accordingly, the color gamut can be utilized sufficiently, the black colorant amount in a color having a high color saturation can be prevented from being increased differently from the related art and a natural color reproduction can be carried out.

The YMCK signal calculating section 16 and a DLUT lattice point signal generating section 17 are the same as those in the first embodiment, and the YMCK signal calculating section 16 predicts YMC by using the L*a*b* input to the first optimum black colorant amount determining section 21 and the second optimum black colorant amount determining section 22 and the third optimum black colorant amount calculated by the third optimum black colorant amount determining section 23, and determines YMCK by the predicted YMC and the third optimum black colorant amount. Moreover, the DLUT lattice point signal generating section 17 generates L*a*b* corresponding to the lattice point of DLUT and inputs the L*a*b* to the first optimum black colorant amount determining section 21 and the second optimum black colorant amount determining section 22. Then, the third optimum black colorant amount determined by the third optimum black colorant amount determining section 22 and the YMC predicted by the YMCK signal calculating section 16 using the third optimum black colorant amount are caused to correspond to the input L*a*b*, thereby creating data on the lattice point. Thus, it is possible to create the DLUT for generating the YMCK from the L*a*b*.

The structure from the YMCK modeling section 12 of the optimum black colorant amount calculating section 11 to the YMCK signal calculating section 16 in the second embodiment of the invention has been described above as a serial flow, and furthermore, the structure for generating the DLUT has been described. In the same manner as in the first embodiment, the operation from the YMCK modeling section 12 to the first optimum black colorant amount modeling section 19 and the second optimum black colorant amount modeling section 20 can be previously carried out if an output device such as a color printer and a black colorant control parameter to be preset are determined. In this case, it is preferable that the first optimum black colorant amount determining section 21, the second optimum black colorant amount determining section 22, the third optimum black colorant amount determining section 23 and the YMCK signal calculating section 16 should be operated. For example, when the DLUT is to be generated, the operation from the YMCK modeling section 12 to the first optimum black colorant amount modeling section 19 and the second optimum black colorant amount modeling section 20 is not required if a processing to reach the first optimum black colorant amount modeling section 19 and the second optimum black colorant amount modeling section 20 is previously performed. It is preferable that the L*a*b* of the lattice point generated by the DLUT lattice point signal generating section 17 should be input to the first optimum black colorant amount determining section 21 and the second optimum black colorant amount determining section 22 to acquire the YMCK signal from the YMCK signal calculating section 16.

Moreover, while the example in which the YMCK signal corresponding to the L*a*b* of the lattice point of the DLUT is acquired has been described above, the invention is not restricted thereto also in the second embodiment. In the same manner as in the first embodiment, for example, typical L*a*b* may be input to the first optimum black colorant amount determining section 21 and the second optimum black colorant amount determining section 22 to generate a transformation coefficient for color-transforming a color input image based on the correspondence relationship with the YMCK signal acquired from the YMCK signal calculating section 16. By using the transformation coefficient thus generated, it is possible to carry out a color transformation from optional L*a*b* to the YMCk signal. By directly using the first optimum black colorant amount determining section 21, the second optimum black colorant amount determining section 22, the third optimum black colorant amount determining section 23 and the YMCK signal calculating section 16, furthermore, it is also possible to acquire the YMCK signal by setting the optional L*a*b* to be an input.

Each of the embodiments of the color processing method according to the invention can also be implemented by a computer program. In that case, the program and data to be used by the same program can also be stored in a computer readable storage medium. Moreover, data on the DLUT and data on a transformation coefficient for carrying out a color transformation can also be stored in the computer readable storage medium. The storage medium can cause the change state of an energy such as magnetism, light or electricity according to the described contents of a program with respect to a reader provided in the hardware resource of a computer and can transfer the described contents of the program to the reader in a signal format corresponding thereto. Examples of the storage medium include a magnetic disk, an optical disk, a CD-ROM, a memory card, and a memory provided in a computer.

Moreover, the DLUT generated as described in each of the embodiments of the color processing apparatus and the color processing method according to the invention can be mounted to constitute a color transforming apparatus for transforming a color signal of the input L*a*b*, for example, into a color signal of CMYK. Furthermore, in the case in which a transformation coefficient is to be generated in addition to the DLUT, it is possible to constitute a color transforming apparatus for carrying out a color transformation by using the transformation coefficient. In addition, various devices provided with such a color transforming apparatus can be constituted and can be applied to an image forming apparatus as will be described below, for example.

Figure 11:
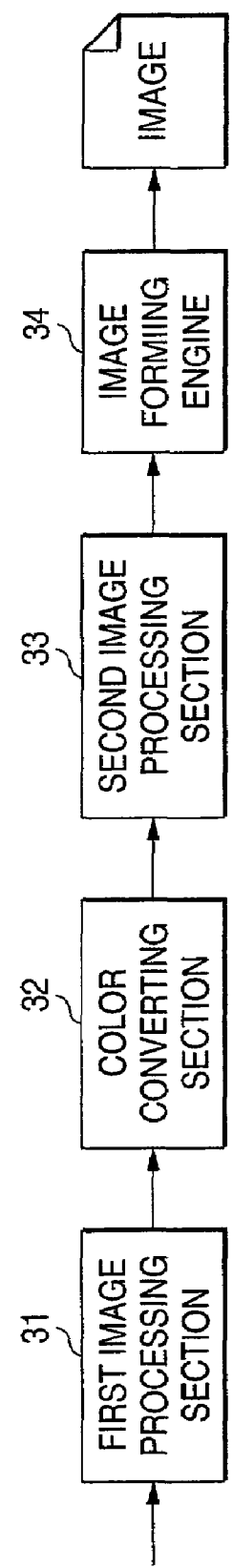
FIG. 11 is a block diagram showing an image forming apparatus according to an embodiment of the invention.

FIG. 11 is a block diagram showing an embodiment of an image forming apparatus according to the invention. In FIG. 11, 31 denotes a first image processing section, 32 denotes a color-transforming section, 33 denotes a second image processing section, and 34 denotes an image forming engine. The first image processing section 31 serves to carry out various image processings before a color transformation is performed over input image data by the color-transforming section 32. Moreover, the second image processing section 33 serves to carry out various image processings over the image data subjected to the color transformation. In some cases, the first image processing section 31 or the second image processing section 33 is not provided.

The image forming engine 34 forms an image in accordance with the image data received from the second image processing section 33 (or the color-transforming section 32) by using a color material including four colors having a black colorant.

The color-transforming section 32 is provided with DLUT generated as described in the first and second embodiments of the color processing apparatus and the color processing method according to the invention, and transforms image data subjected to the image processing in the first image processing section 31 (or input image data) into a four-color signal including black to be used in the image forming engine 34. The DLUT provided in the color-transforming section 32 is generated by using a model corresponding to the image forming engine 34 and determines a black colorant amount in consideration of a coverage limitation. Moreover, the black colorant amount is regulated so as not to be extremely increased in a color having a high color saturation. An image is formed by the image forming engine 34 based on such image data so that an unnecessary color gamut compression is not generated beyond the coverage limitation, a color can be prevented from becoming dull by an unnatural increase in a black colorant amount and a good image can be formed by a natural color reproduction.

In the case in which the DLUT is used as the color-transforming section 32, and furthermore, the transformation coefficient for the color transformation is generated as described above, a color transformation using the same coefficient may be carried out. In both cases of the color transformation using the DLUT and the color transformation using the transformation coefficient, a color space on the input side is not restricted to an L*a*b* color space but another color space such as RGB, L*u*v* or XYZ may be used. A color space on the output side is set to be a four-color space including black corresponding to the image forming engine 34.

As is apparent from the above description, according to the invention, a first optimum black colorant amount in all color gamuts which can be represented by four colors is determined through a prediction or an extrapolation prediction by using a set of a plurality of typical color signals in a partial color gamut which can be represented by three colors and a first black colorant amount corresponding to the typical color signals. Therefore, the whole color gamut can be utilized, and furthermore, a color reproduction can be carried out more naturally.

According to the invention, moreover, a first optimum black colorant amount in all color gamuts which can be represented by four colors is predicted by using a set of a plurality of typical color signals in a partial color gamut which can be represented by three colors and a first black colorant amount corresponding to the typical color signals, and furthermore, a second optimum black colorant amount in all the color gamuts is predicted from a set of a plurality of typical color signals and a first black colorant amount to satisfy a coverage limitation corresponding to the typical color signals and a set of a plurality of typical color signals belonging onto an outermost contour curved surface of a color gamut which can be represented by three colors or four colors including black and satisfies the coverage limitation and a second black colorant amount corresponding to the typical color signals, thereby determining a third optimum black colorant amount in all the color gamuts by using the first optimum black colorant amount and the second optimum black colorant amount. For example, consequently, there are produced advantages that the third optimum black colorant amount can be determined by the weighted average of the first optimum black colorant amount and the second optimum black colorant amount using a weight depending on at least one of a luminosity, a color saturation and a hue which are calculated from a color signal in a target color space, the whole color gamut can be utilized, and furthermore, a color reproduction can be carried out more naturally.

What is claimed is:

1. A color processing method for generating a four-color signal including black for reproducing an arbitrary color signal in a target color space from the color signal, the method comprising the steps of:
    calculating first black colorant amounts from a plurality of typical color signals belonging to a partial color gamut being a color gamut which can be represented by at least three colors and which satisfies a coverage limitation, wherein the first black colorant amounts correspond to the plurality of typical color signals;
    determining first optimum black colorant amounts corresponding to the arbitrary color signal in a whole color gamut, which can be represented by four colors and includes the partial color gamut, by using sets of the plurality of typical color signals and the first black colorant amounts; and
    outputting the four-color signal based on the first optimum black colorant amounts.

2. The color processing method according to claim 1, wherein the first black colorant amount is calculated by multiplying an achromatic black colorant amount for the typical color signal by a black colorant control parameter depending on at least one of a luminosity, a color saturation and a hue, which are calculated from the typical color signal.

3. A computer readable storage medium storing a program for causing a computer to execute a color processing method for generating a four-color signal including black for reproducing an arbitrary color signal in a target color space from the color signal, the method comprising the steps of:
    calculating first black colorant amounts from a plurality of typical color signals belonging to a partial color gamut being a color gamut which can be represented by at least three colors and which satisfies a coverage limitation, wherein the first black colorant amounts correspond to the plurality of typical color signals;
    determining first optimum black colorant amounts corresponding to the arbitrary color signal in a whole color gamut, which can be represented by four colors and includes the partial color gamut, by using sets of the plurality of typical color signals and the first black colorant a amounts; and
    outputting the four-color signal based on the first optimum black colorant amounts.

4. A color processing apparatus for generating a four-color signal including black for reproducing an arbitrary color signal in a target color space from the color signal, the color processing apparatus comprising:
    a first black colorant amount calculating section for calculating first black colorant amounts from a plurality of typical color signals belonging to a partial color gamut being a color gamut which can be represented by at least three colors and which satisfies a coverage limitation, wherein the first black colorant amounts correspond to the plurality of typical color signals;
    a first optimum black colorant amount determining section for determining first optimum black colorant amounts corresponding to the arbitrary color signal in a whole color gamut, which can be represented by four colors and includes the partial color gamut, by using sets of the plurality of typical color signals and the first black colorant amounts; and
    an outputting section for outputting the color signal based on the optimum black colorant amounts.

5. The color processing apparatus according to claim 4, wherein the first black colorant amount calculating section calculates the first black colorant amount by multiplying an achromatic black colorant amount for the typical color signal by a black colorant control parameter depending on at least one of a luminosity, a color saturation and a hue, which are calculated from the typical color signal.

6. A color processing method for generating a four-color signal including black for reproducing an arbitrary color signal in a target color space from the color signal, the method comprising the steps of:
    calculating first black colorant amounts from a plurality of typical color signals belonging to a partial color gamut being a color gamut, which can be represented by at least three colors, wherein the first black colorant amounts correspond to the plurality of typical color signals;
    predicting first optimum black colorant amounts in a whole color gamut, which can be represented by four colors and includes the partial color gamut, by using sets of the typical color signals and the first black colorant amounts;
    calculating second black colorant amounts corresponding to the plurality of typical color signals belonging onto an outermost contour curved surface in a color gamut, which can be represented by three colors or four colors including black and satisfies a coverage limitation,
    predicting second optimum black colorant amounts in the whole color gamut from set of the typical color signals in the partial color gamut and the first black colorant amounts corresponding to the typical color signals and sets of the typical color signals belonging to the outermost contour curved surface of the color gamut and the second black colorant amounts corresponding to the typical color signals; and
    determining third optimum black colorant amounts in the whole color gamut by using the first optimum black colorant amounts and the second optimum black colorant amounts.

7. The color processing method according to claim 6, wherein in the third optimum black colorant amounts determining step, the third optimum black colorant amounts are determined by a weighted average using a weight depending on at least one of a luminosity, a color saturation and a hue, which are calculated from a color signal in the target color space.

8. The color processing method according to claim 6, wherein the plurality of second black colorant amounts corresponding to the plurality of typical color signals belonging onto the outermost contour curved surface of the color gamut, which can be represented by the three colors or the four colors including black and satisfies the coverage limitation, are maximum black colorant amounts when a color signal in the target color space in the color gamut, which can be represented by the three colors or on an outer contour thereof, is set to be a starting point and the black colorant amount is a maximum in the four-color signal reproducing a color signal calculated by a search over a half line extended in a specific direction and satisfying the coverage limitation.

9. The color processing method according to claim 8, wherein the specific direction indicates a direction of an increase in the luminosity when the four-color signal reproducing the color signal at the starting point in which the black colorant amount is a maximum does not satisfy the coverage limitation; and wherein the specific direction indicates a direction of a decrease in the luminosity when the four-color signal satisfies the coverage limitation.

10. The color processing method according to claim 8, wherein the specific direction indicates a color gamut compression direction when the four-color signal reproducing the color signal at the starting point in which the black colorant amount is a maximum does not satisfy the coverage limitation; and wherein the specific direction indicates a reverse direction to the color gamut compression direction when the four-color signal satisfies the coverage limitation.

11. The color processing method according to claim 6, further comprising the steps of:

obtaining an optimum black colorant amount corresponding to the target color signal in the target color space based on the first optimum black colorant amount or the third optimum black colorant amount in the determined whole color gamut;

determining three remaining colors excluding black are from the optimum black colorant amount and the target color signal; and calculating the four-color signal including black.

12. The color processing method according to claim 11, further comprising the steps of:

relating the plurality of target color signals in the target color space to the four-color signal obtained for the target color signals in a corresponding manner to generate a multidimensional transformation table.

13. The color processing method according to claim 12, further comprising the steps of:

color-transforming arbitrary color signals in the target color space into the four-color signal by using the multidimensional transformation table.

14. The color processing method according to claim 11, further comprising the steps of:

generating a transformation coefficient for transforming the color signal based on a correspondence relationship between the plurality of target color signals in the target color space and the four-color signal obtained for the target color signal.

15. The color processing method according to claim 14, further comprising the steps of:

color-transforming arbitrary color signals in the target color space into four-color signal wherein a color transformation of an arbitrary color signal from the four-color signal is done by using the transformation coefficient.

16. A color processing apparatus for generating a four-color signal including black for reproducing an arbitrary color signal in a target color space from the color signal, the color processing apparatus comprising:

a first black colorant amount calculating section for calculating first black colorant amounts from a plurality of typical color signals belonging to a partial color gamut being a color gamut, which can be represented by at least three colors, wherein the first black colorant amounts correspond to the plurality of typical color signals;

a first optimum black colorant amount determining section for predicting first optimum black colorant amounts in a whole color gamut, which can be represented by four colors and includes the partial color gamut, by using sets of the typical color signals and the first black colorant amounts calculated by the first black colorant amount calculating section;

a second black colorant amount calculating section for calculating second black colorant amounts corresponding to the plurality of typical color signals belonging onto an outermost contour curved surface in a color gamut, which can be represented by three colors or four colors including black and satisfies a coverage limitation;

a second optimum black colorant amount determining section for predicting second optimum black colorant amounts in the whole color gamut from sets of the typical color signals in the partial color gamut and the first black colorant amounts calculated by the first black colorant amount calculating section and corresponding to the typical color signals and sets of the typical color signals belonging to the outermost contour curved surface of the color gamut and the second black colorant amounts calculated by the second black colorant amount calculating section and corresponding to the typical color signals; and a third optimum black colorant amount determining section for determining third optimum black colorant amounts in the whole color gamut by using the first optimum black colorant amounts predicted by the first optimum black colorant amount determining section and the second optimum black colorant amounts predicted by the second optimum black colorant amount determining section.

17. The color processing apparatus according to claim 16, wherein the third optimum black colorant amounts determining section determines the third optimum black colorant amounts by a weighted average using a weight depending on at least one of a luminosity, a color saturation and a hue, which are calculated from a color signal in the target color space.

18. The color processing apparatus according to claim 16, wherein the plurality of second black colorant amounts, which are calculated by the second black colorant amount calculating section, corresponding to the plurality of typical color signals belonging onto the outermost contour curved surface of the color gamut, which can be represented by the three colors or the four colors including black and satisfies the coverage limitation, are maximum black colorant amounts when a color signal in the target color space in the color gamut, which can be represented by the three colors or on an outer contour thereof, is set to be a starting point and the black colorant amount is a maximum in the four-color signal reproducing a color signal calculated by a search over a half line extended in a specific direction and satisfying the coverage limitation.

19. The color processing apparatus according to claim 18, wherein the specific direction indicates a direction of an increase in the luminosity when the four-color signal reproducing the color signal at the starting point in which the black colorant amount is a maximum does not satisfy the coverage limitation; and wherein the specific direction indicates a direction of a decrease in the luminosity when the four-color signal satisfies the coverage limitation.

20. The color processing apparatus according to claim 18, wherein the specific direction indicates a color gamut compression direction when the four-color signal reproducing the color signal at the starting point in which the black colorant amount is a maximum does not satisfy the coverage limitation; and wherein the specific direction indicates a reverse direction to the color gamut compression direction when the four-color signal satisfies the coverage limitation.

21. The color processing apparatus according to claim 16, further comprising:

a color signal calculating section for obtaining an optimum black colorant amount corresponding to the target color signal in the target color space based on the first optimum black colorant amount predicted by the first optimum black colorant amount determining section or the third optimum black colorant amount determined by the third optimum black colorant amount determining section in the determined whole color gamut, determining three remaining colors excluding black are from the optimum black colorant amount and the target color signal, and calculating the four-color signal including black.

22. The color processing apparatus according to claim 21, further comprising:

a transformation coefficient generating section for generating a transformation coefficient for transforming the color signal based on a correspondence relationship between the plurality of target color signals in the target color space and the four-color signal obtained for the target color signal.

23. The color processing apparatus according to claim 21, further comprising:

a multidimensional transformation table generating section for relating the plurality of target color signals in the target color space to the four-color signal obtained for the target color signals in a corresponding manner to generate a multidimensional transformation table.

24. A computer readable storage medium storing multidimensional transformation table or a transformation coefficient therein, wherein the multidimensional transformation table is generated from a correspondence relationship between a plurality of target color signals in a target color space and a four-color signal, wherein the four-color signal is obtained by a color processing method for generating the four-color signal including black for reproducing an arbitrary color signal in the target color space from the color signal, the method comprising the steps of:

calculating first black colorant amounts from a plurality of typical color signals belonging to a partial color gamut being a color gamut, which can be represented by at least three colors, wherein the first black colorant amounts correspond to the plurality of typical color signals;

determining first optimum black colorant amounts in a whole color gamut, which can be represented by four colors and includes the partial color gamut, by using sets of the typical color signals and the first black colorant amounts;

obtaining an optimum black colorant amount corresponding to the target color signal in the target color space based on the first optimum black colorant amount or a third optimum black colorant amount in the determined whole color gamut;

determining three remaining colors excluding black are from the optimum black colorant amount and the target color signal; and calculating the four-color signal including black.

25. A color transforming apparatus comprising:

a color-transforming section for color-transforming an inputted arbitrary color signal in a target color space into a four-color signal by using a multidimensional transformation table, wherein the multidimensional transformation table is generated by a color processing apparatus for generating the four-color signal including black for reproducing an arbitrary color signal in the target color space from the color signal, the color processing apparatus comprising:

a first black colorant amount calculating section for calculating first black colorant amounts from a plurality of typical color signals belonging to a partial color gamut being a color gamut, which can be represented by at least three colors, wherein the first black colorant amounts correspond to the plurality of typical color signals;

a first optimum black colorant amount determining section for predicting first optimum black colorant amounts in a whole color gamut, which can be represented by four colors and includes the partial color gamut, by using sets of the typical color signals and the first black colorant amounts calculated by the first black colorant amount calculating section;

a second black colorant amount calculating section for calculating second black colorant amounts corresponding to the plurality of typical color signals belonging onto an outermost contour curved surface in a color gamut, which can be represented by three colors or four colors including black and satisfies a coverage limitation;

a second optimum black colorant amount determining section for predicting second optimum black colorant amounts in the whole color gamut from sets of the typical color signals in the partial color gamut and the first black colorant amounts calculated by the first black colorant amount calculating section and corresponding to the typical color signals and sets of the typical color signals belonging to the outermost contour curved surface of the color gamut and the second black colorant amounts calculated by the second black colorant amount calculating section and corresponding to the typical color signals;

a third optimum black colorant amount determining section for determining third optimum black colorant amounts in the whole color gamut by using the first optimum black colorant amounts predicted by the first optimum black colorant amount determining section and the second optimum black colorant amounts predicted by the second optimum black colorant amount determining section;

a color signal calculating section for obtaining an optimum black colorant amount corresponding to the target color signal in the target color space based on the first optimum black colorant amount predicted by the first optimum black colorant amount determining section or the third optimum black colorant amount determined by the third optimum black colorant amount determining section in the determined whole color gamut, determining three remaining colors excluding black are from the optimum black colorant amount and the target color signal, and calculating the four-color signal including black; and a multidimensional transformation table generating section for relating the plurality of target color signals in the target color space to the four-color signal obtained for the target color signals in a corresponding manner to generate a multidimensional transformation table.

26. A color transforming apparatus comprising:

a color-transforming section for color-transforming an inputted arbitrary color signal in a target color space into a four-color signal by using a transformation coefficient, wherein the transformation coefficient is generated by a color processing apparatus for generating the four-color signal including black for reproducing an arbitrary color signal in the target color space from the color signal, the color processing apparatus comprising:

a first black colorant amount calculating section for calculating first black colorant amounts from a plurality of typical color signals belonging to a partial color gamut being a color gamut, which can be represented by at least three colors, wherein the first black colorant amounts correspond to the plurality of typical color signals;

a first optimum black colorant amount determining section for predicting first optimum black colorant amounts in a whole color gamut, which can be represented by four colors and includes the partial color gamut, by using sets of the typical color signals and the first black colorant amounts calculated by the first black colorant amount calculating section;

a second black colorant amount calculating section for calculating second black colorant amounts corresponding to the plurality of typical color signals belonging onto an outermost contour curved surface in a color gamut, which can be represented by three colors or four colors including black and satisfies a coverage limitation;

a second optimum black colorant amount determining section for predicting second optimum black colorant amounts in the whole color gamut from sets of the typical color signals in the partial color gamut and the first black colorant amounts calculated by the first black colorant amount calculating section and corresponding to the typical color signals and sets of the typical color signals belonging to the outermost contour curved surface of the color gamut and the second black colorant amounts calculated by the second black colorant amount calculating section and corresponding to the typical color signals;

a third optimum black colorant amount determining section for determining third optimum black colorant amounts in the whole color gamut by using the first optimum black colorant amounts predicted by the first optimum black colorant amount determining section and the second optimum black colorant amounts predicted by the second optimum black colorant amount determining section;

a color signal calculating section for obtaining an optimum black colorant amount corresponding to the target color signal in the target color space based on the first optimum black colorant amount predicted by the first optimum black colorant amount determining section or the third optimum black colorant amount determined by the third optimum black colorant amount determining section in the determined whole color gamut, determining three remaining colors excluding black are from the optimum black colorant amount and the target color signal, and calculating the four-color signal including black; and a transformation coefficient generating section for generating a transformation coefficient for transforming the color signal based on a correspondence relationship between the plurality of target color signals in the target color space and the four-color signal obtained for the target color signal.

27. An image forming apparatus for forming an image in a target color space on a recorded medium, the image forming apparatus comprising:

a color transformation apparatus for transforming a color signal representing the image into a four-color signal including black for reproducing the image; and an image forming section for forming the image on the recording medium in accordance with the four-color signal transformed by the color transformation apparatus, wherein the color transformation apparatus comprises a color-transforming section for color-transforming an inputted arbitrary color signal in a target color space into a four-color signal by using a multidimensional transformation table;

wherein the multidimensional transformation table is generated by a color processing apparatus for generating the four-color signal including black for reproducing an arbitrary color signal in the target color space from the color signal, the color processing apparatus comprising:

a first black colorant amount calculating section for calculating first black colorant amounts from a plurality of typical color signals belonging to a partial color gamut being a color gamut, which can be represented by at least three colors, wherein the first black colorant amounts correspond to the plurality of typical color signals;

a first optimum black colorant amount determining section for predicting first optimum black colorant amounts in a whole color gamut, which can be represented by four colors and includes the partial color gamut, by using sets of the typical color signals and the first black colorant amounts calculated by the first black colorant amount calculating section;

a second black colorant amount calculating section for calculating second black colorant amounts corresponding to the plurality of typical color signals belonging onto an outermost contour curved surface in a color gamut, which can be represented by three colors or four colors including black and satisfies a coverage limitation;

a second optimum black colorant amount determining section for predicting second optimum black colorant amounts in the whole color gamut from sets of the typical color signals in the partial color gamut and the first black colorant amounts calculated by the first black colorant amount calculating section and corresponding to the typical color signals and sets of the typical color signals belonging to the outermost contour curved surface of the color gamut and the second black colorant amounts calculated by the second black colorant amount calculating section and corresponding to the typical color signals;

a third optimum black colorant amount determining section for determining third optimum black colorant amounts in the whole color gamut by using the first optimum black colorant amounts predicted by the first optimum black colorant amount determining section and the second optimum black colorant amounts predicted by the second optimum black colorant amount determining section;

a color signal calculating section for obtaining an optimum black colorant amount corresponding to the target color signal in the target color space based on the first optimum black colorant amount predicted by the first optimum black colorant amount determining section or the third optimum black colorant amount determined by the third optimum black colorant amount determining section in the determined whole color gamut, determining three remaining colors excluding black are from the optimum black colorant amount and the target color signal, and calculating the four-color signal including black; and a multidimensional transformation table generating section for relating the plurality of target color signals in the target color space to the four-color signal obtained for the target color signals in a corresponding manner to generate a multidimensional transformation table.

* * * * *